2 Sheets, Sheet 1.
G. M. Phelps,
Printing Telegraph.
No. 6863
Reissued Jan. 18, 1876
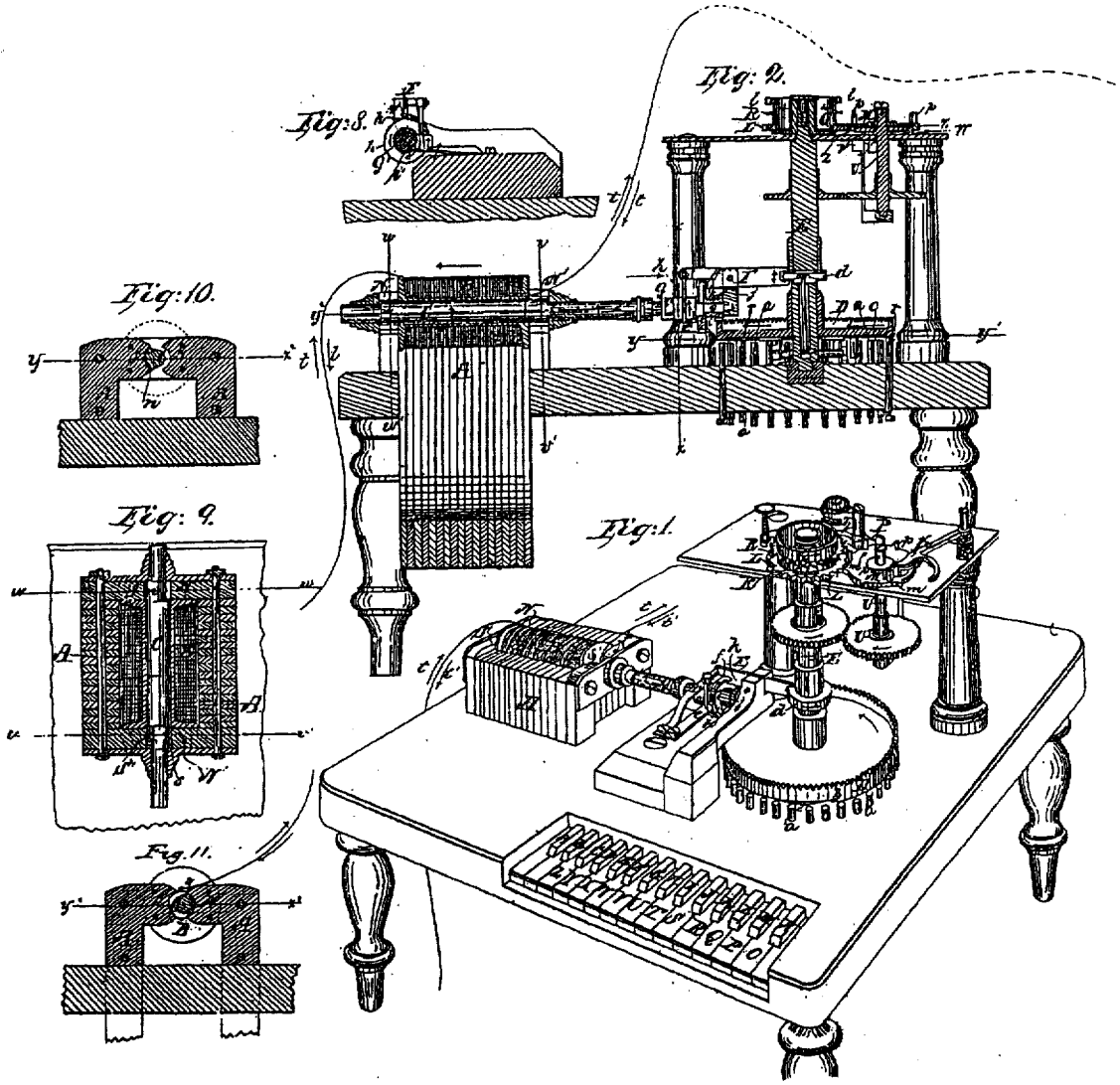
Witnesses:
Thos. G. Crimeling
Austin F. Park.
Inventor:
George M. Phelps
N. PETERS, Photo-Lithographer, Washington, D. C.

G. M. Phelps,
Printing Telegraph.

8 Sheets. Sheet 2.

No 6863

Reissued Jan. 18, 1876

Witnesses:
Thos. G. Cornelius
Austin F. Park

Inventor:
Geo. M. Phelps

N. PETERS, Photo-Lithographer, Washington, D. C.

UNITED STATES PATENT OFFICE.

GEORGE M. PHELPS, OF BROOKLYN, NEW YORK, ASSIGNOR, BY MESNE ASSIGNMENTS, TO THE WESTERN UNION TELEGRAPH COMPANY.

IMPROVEMENT IN TELEGRAPHIC MACHINES.

Specification forming part of Letters Patent No. 26,003, dated November 1, 1859; extended seven years; reissue No. 6,863, dated January 18, 1876; application filed December 15, 1875.

*To all whom it may concern:*

Be it known that I, GEORGE M. PHELPS, now of Brooklyn, in the county of Kings and State of New York, have invented a new and useful Improvement in Printing-Telegraphs, of which the following is a specification, reference being had to the accompanying drawings, in which—

Figure 1:
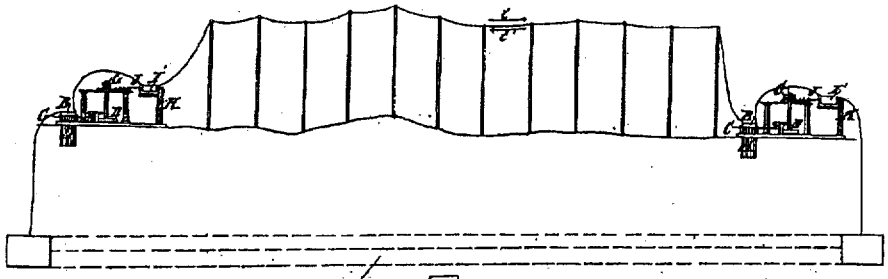
Figure 3:
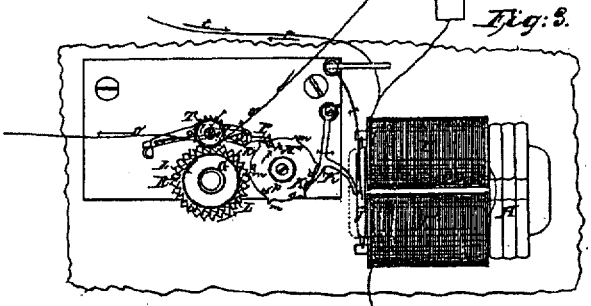
Figure 4:
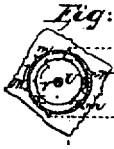
Figure 5:
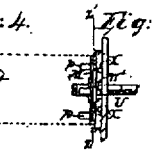
Figure 7:
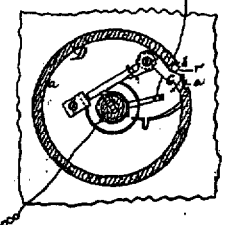
Figure 6:
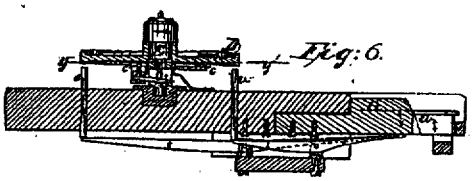

Figure 1 is a perspective view of an apparatus embodying my invention; Fig. 2, a sectional elevation; Fig. 3, a plan of the printing mechanism; Fig. 4, a section at, and plan of the parts underneath the line *z z;* Fig. 5, a sectional elevation of the parts shown in section in Fig. 4 turned to a vertical position; Fig. 6, a vertical section of the key-board; Fig. 7, a section at, and plan of the parts below the line *y y;* Fig. 8, a section at, and elevation of some of the parts on the right-hand side of the line *x x;* Fig. 9, a section of the magneto-electric inductor in the plane of the line $y^2$ $x^2$; Fig. 10, a section of the same in the plane of the line *w w′;* Fig. 11, still another section of the same in the plane of the line *v v′;* and Fig. 12 is a diagram representing the arrangement of the magneto-electric circuit in connection with the apparatus.

The arrows placed upon or near the respective parts indicate the direction in which the parts, respectively, move.

One part of my invention relates to the mode of producing from a magneto-electric inductor the currents of electricity which are employed to actuate the mechanism of the instruments in transmitting intelligence.

A represents a compound permanent magnet. B is a helical coil of insulated wire, and C an intermittingly-rotating armature, preferably of soft iron. N N′ represent the two north, and S S′ the two south, poles of the magnet A, while the corresponding parts of the armature C, which are acted upon by the poles of the magnet, are represented by *n* and *s*. The armature C is represented at rest, and in the same position in each of the figures. During each complete revolution of the armature C its magnetic polarity undergoes two reversals, and consequently during the same time two distinct pulsations of magneto-electricity are induced in the surrounding coil B, which flow through the helices I I′ of the electro-magnet which regulates the position of the type-wheel and controls the mechanism for effecting the impression, and also through the entire constantly-closed telegraphic circuit. These pulsations are alternately positive and negative, as indicated by the arrows *t* and *t′*, respectively. While the armature C is turning through the first half of its revolution it induces, for example, a positive current, and while turning through the last half of its revolution a negative current passing through the helices I I′. The armature C is mechanically connected with the key-board in such a manner that the former makes one complete revolution every time that any one of the finger-keys is properly depressed. By depressing one of the keys, as G in Fig. 1, a pin, *a*, is thrust upward against the wheel D, (which is kept constantly revolving in the direction of the arrow by means of any suitable prime mover,) as shown at *r* in Fig. 2, and by continuing the pressure upon the key until the notch *b* on the under surface of the wheel D comes over the elevated pin, the pin is raised into the notch, as shown at *r′* in Figs. 2 and 7, and is struck by the arm *c* of a lever which is pivoted at *c′* to the under side of the wheel D. When the arm *c* strikes against the elevated pin, it is forced inward toward the center of the wheel D, which causes the short arm of the same lever, by means of suitable mechanism, to slide the collar *d* upward upon the shaft E, as best seen in Fig. 7.

As the revolving collar *d* rises (see Figs. 1 and 2) it moves a lever, F, so as to press down a stop or detent, *e*, which releases the armature C, leaving it free to make a revolution. At the same instant it moves a guide, *k*, which permits a spring-catch, *f*, fastened upon the shaft *g* of the armature C to engage with the teeth of a ratchet-wheel, *h*. The latter is secured to a hollow shaft, *i*, which turns upon the shaft *g*, and is secured to a pinion, *j*, which engages with the teeth of the wheel D, and revolves constantly with it. Thus it will be understood that at the moment the catch *f* engages with the teeth of the ratchet-wheel *h*, the armature C is made to turn with the ratchet-wheel and pinion *j*, and at the same speed; but before the armature completes a revolution, the arm *c* releases itself from the elevated pin which forced it inward, and allows the detent *e* to spring into the notch $i^1$, (see Fig. 8,) and also to move the lever F, so that the projection *k* shall remove the catch *f* from the ratchet, and thus stop the armature at the completion of one revolution. The object of the spring-catch $i^2$ is to prevent the armature C from rebounding when thus suddenly arrested. The constantly-revolving wheel D makes a revolution in the same time that the type-wheel G makes one. There is a pin, *a*, corresponding with each of the keys, and a key for each type, character, or space upon the type-wheel. The pins *a a* are arranged at equal distances apart, the same as the type *l l*, which latter are only shown in Fig. 2.

It is obvious that many modifications may be made in the above-described mechanism without materially affecting the result. Thus, other forms of magneto-induction apparatus may be employed instead of the particular arrangement which has been described, the construction and operation of the mechanism that moves in unison with the type-wheel and controls the action of the depressed finger-keys upon the inductor may be varied, and various devices may be employed to connect the finger-key with the movable parts of the magneto-inductor, so as to cause the latter to move a certain specified distance each time a key is depressed, without affecting the essential characteristics of this part of my invention.

Another part of my invention consists in the employment of the pulsations or currents from a magneto generator or inductor to control the position of the type-wheel of a printing-telegraph.

In Fig. 3, H represents a permanent horseshoe-magnet, which is fixed in an upright position upon the base of the apparatus. Through the center of each of the helices I I′ a core of soft iron passes. These two cores are, respectively, screwed into the north and south poles of the permanent magnet H, and thereby themselves become magnetic by induction, so that when the apparatus is at rest the armature J will be retained in contact with the outer ends of the cores by virtue of their induced magnetic attraction. The spring J′ is so arranged as to act upon the armature J in opposition to the attraction of the cores, and its tension should be almost sufficient to separate the armature from the cores when no current is traversing the helices I I′.

While the armature C is turning through the first half of its revolution, it induces a current, which, in passing through the helices I I′, lessens the attractive power of the cores within the helices by its tendency to generate an opposite magnetic polarity from that already existing in the cores, and thus releases the armature J. The latter flies away from the cores by the action of the spring J′, and strikes against a detent, K, thereby putting in action the part that applies the paper *o* to the type-wheel G. While, on the other hand, the armature C is turning through the latter half of its revolution, it induces a current of opposite polarity, which increases the attraction of the cores within the helices I I′ for the armature J beyond what it is when no current is passing through these helices; and I prefer so to gear the part M, which will be hereinafter described, that carries the armature J back into contact with the cores, in respect to the motion of the armature C, that the armature J shall reach the magnet just when the attraction of the cores is thus increased, in order that the armature J shall be more surely retained in contact with them when put back thereto. The type-wheel G is carried by a frictional connection between it and the driving-shaft E, and is thus made to revolve in unison with the wheel D. When transmitting to a distant station it is in like manner essential that the wheel D of the transmitting-instrument and the type-wheel G of the receiving-instrument should revolve synchronously in unison. This may be in a great measure effected by the application of some suitable speed-governor. I prefer to employ for this purpose the mechanism set forth in my former Letters Patent of the United States, No. 19,042, dated January 5, 1858, and to which reference is had. This device may be so arranged in connection with each instrument as to control the rate of movement of their respective driving-shafts E, and the two governors may be so adjusted that the revolutions of the wheel D of one instrument will be almost exactly synchronous with those of the type-wheel G of the other instrument.

In consequence of the impossibility of securing absolute uniformity in the rate of movement of two separate machines of this kind by the use of any known mechanical means, it becomes necessary to provide some means of correcting the error or inaccuracy in the position of the type-wheel which would otherwise arise from this imperfection in the action of the governor, and which error would constantly tend to accumulate with every successive revolution of the type-wheel. In order to effect this result, the position of the type-wheel with respect to the device which gives the impression is controlled by the action of the magneto-electric currents in the following manner: A ring of teeth, L, which in number are equal to the letters, characters, and spaces upon the type-wheel, extends around and is fixed upon the type-wheel, the teeth, like the characters themselves, being arranged at equal distances apart. Each time the armature J springs back from the magnet it moves the detent K, so as thereby to release an intermittently-moving corrector, M, one tooth, *m*, of which, during each movement of the corrector, so passes between or engages with the teeth of the ring L as to turn the type-wheel a little backward upon the shaft E in case the type-wheel is running faster, or forward if running slower, than the transmitting mechanism of the sending-instrument. Thus the type-wheel is prevented from getting sufficiently behind or in advance of the transmitting mechanism to present a wrong letter to the platen to be printed, and insures that the required type shall be correctly opposite to the platen O when the latter, controlled in its action by the retreat of the armature J, applies the paper to the type-wheel. In Fig. 1 the corrector is represented at rest and disengaged from the teeth L; but in Fig. 3 the corrector is shown in motion and engaged with those teeth.

The corrector M is so constructed, arranged, and geared with the prime mover, which drives the type-wheel by a frictional connection, that, while the corrector is in motion, the tooth or teeth *m* of the corrector move with substantially the same speed as the teeth L of the friction-driven type-wheel, and a tooth of the corrector remains so engaged with the teeth L as to positively move or turn the type-wheel with the proper speed during the time the platen O is applying the paper to the type, the platen being actuated by or simultaneously with the corrector, substantially as shown in Figs. 1 and 3.

Another part of my invention consists in the manner of making the cylindrical platen turn upon its axis while applying the paper to the type with the same surface speed as the type themselves, so as to produce clear and distinct impressions, and at the same time to feed the paper along to receive the successive impressions. This I accomplish by means of two rings of teeth, R and T, of suitable construction, arranged respectively upon the type-wheel G and platen O, so that the said rings of teeth shall engage with each other and turn the platen with the proper movement while the platen is applying the paper to the type, and be disengaged, so as to leave the platen at rest, whenever the latter is not applying the power. The arrangement of the parts is clearly shown in Fig. 3.

Another part of my invention consists in increasing the capacity of the instruments for transmitting words and sentences, by causing the transmitting mechanism and type-wheel to run so much faster than the devices which replace the armature J upon its magnet and apply the paper to the type are permitted to operate, that consecutive letters upon the type-wheel cannot be printed from in immediate succession. Thus, for example, the type-wheel G turns as fast as the intermittently-moving corrector M, which returns the armature J to the magnet, and, by means of six pins, *p*, acting successively upon a lever, P, which carries the platen O, applies the paper *o* to the type just six times during one of its own revolutions; consequently, no more than six of the whole number of type upon the wheel can be printed from during one of its revolutions.

To illustrate the great importance of this part of my invention, I will suppose that the twenty-six letters of the alphabet, a period, and a blank space are arranged around the circumference of the type-wheel in the usual consecutive order, and that the phrase "George M. Phelps' Electro-Magnetic Printing-Telegraph" is to be printed. If the transmitting mechanism and type-wheel are run so slow that every type can be printed from during one revolution, it will require twenty-six revolutions of the type-wheel to print the phrase; and I will suppose that those twenty-six revolutions require twenty-six seconds of time. But if the type-wheel and transmitting device run twice as fast, so that no nearer than alternate types can be printed from, then only the same number of revolutions of the type-wheel will be required, which will occupy but fourteen seconds; and if the last-named speed of the type-wheel is doubled, so that only seven types can be printed from during one revolution, then only thirty turns will be required, which will require but seven and a half seconds. I usually prefer to construct the instruments intended to be used on land lines of not more than five hundred miles in length, with the transmitting apparatus and type-wheel so geared in respect to the parts that apply the paper to the type that no more than five letters can be printed at one revolution of the type-wheel, in which case the type-wheel may be run at the rate of from one hundred to one hundred and eighty revolutions per minute.

Another part of my invention consists in the following mode in which I cause a constantly-revolving wheel or shaft, U or *i*, to turn the corrector M, armature C, or other wheel or shaft, a certain fixed distance, with the same speed as itself, at any time and any desired number of times, by simply moving a detent, K or *e*—that is, by the use of a ratchet-wheel, V or *h*, fast on the driving wheel or shaft, a springing or removable dog or catch, W or *f*, fast on the corrector M, armature C, or wheel or shaft to be driven, and a fixed or movable guide or guides, X or *k*, the whole being so combined and arranged with reference to each other, substantially as illustrated in the accompanying drawings, that whenever the corrector M, or other driven wheel or shaft, is at rest, and the detent K or *e* is so moved as to release the wheel or shaft which is to be driven, and leave the same free to be turned, the catch W or *f* is thereupon instantly engaged with the running ratchet-wheel V or *h*; and that, whenever the detent stops the motion of the driven wheel or shaft M or C, the catch or dog is just at that instant disengaged from the ratchet by the guide X or *k*, and is thereby kept disengaged until the detent is again moved, so as to leave the corrector or other wheel or shaft free to be turned.

Having thus fully described my improvements, what I claim as my invention, and desire to secure by Letters Patent, is—

1. A movable magneto-inductor or armature, which is capable of being brought into momentary action through the depression of any one of a series of finger-keys, in combination with a mechanical device which moves in unison, or nearly so, with a continuously-revolving type-wheel or type-wheel shaft, and which device controls the action of the finger-keys upon the magneto-inductor.

2. The type-wheel of a printing-telegraph, operated or controlled by currents from a magneto-generator.

3. The combination of a type-wheel and printing mechanism, both operated or controlled by currents from a magneto-generator.

4. The rings of teeth R and T, so arranged upon the type-wheel and platen, respectively, as to cause the platen to be moved with the type-wheel, and at the same surface speed, while the impression is being given.

5. An impression device having its speed of movement so arranged with reference to the transmitting mechanism, and of the continuously-revolving type-wheel upon which it acts, that two or more characters or divisions of the type-wheel shall pass the platen each time that the printing mechanism acts.

6. The revolving wheel or shaft U or *i*, in combination with the ratchet-wheel V or *h*, catch W or *f*, guide X or *k*, and detent K or *e*, whereby the said wheel or shaft may be made to turn the corrector M, armature C, or another wheel or shaft, a certain fixed distance, with the same speed as itself, at any time, and any required number of times, substantially as herein specified.

G. M. PHELPS.

Witnesses:
GERRITT SMITH,
GEO. A. HAMILTON.